US012606214B2

(12) United States Patent
El Dana

(10) Patent No.: US 12,606,214 B2
(45) Date of Patent: Apr. 21, 2026

(54) ROUTING SYSTEM AND METHOD FOR AUTOMATICALLY ROUTING A MOTOR VEHICLE IN A MULTILEVEL PARKING AREA

(71) Applicant: Bayerische Motoren Werke Aktiengesellschaft, Munich (DE)

(72) Inventor: Mohamad Mounir El Dana, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 101 days.

(21) Appl. No.: 18/697,765

(22) PCT Filed: Sep. 27, 2022

(86) PCT No.: PCT/EP2022/076740
§ 371 (c)(1),
(2) Date: Apr. 2, 2024

(87) PCT Pub. No.: WO2023/061743
PCT Pub. Date: Apr. 20, 2023

(65) Prior Publication Data
US 2024/0409128 A1 Dec. 12, 2024

(30) Foreign Application Priority Data
Oct. 15, 2021 (DE) .................... 10 2021 126 742.0

(51) Int. Cl.
*B60W 60/00* (2020.01)
*B60W 50/14* (2020.01)
*G01C 21/20* (2006.01)

(52) U.S. Cl.
CPC ........ *B60W 60/0051* (2020.02); *B60W 50/14* (2013.01); *G01C 21/206* (2013.01); *B60W 2420/403* (2013.01); *B60W 2556/50* (2020.02)

(58) Field of Classification Search
None
See application file for complete search history.

(56) References Cited

U.S. PATENT DOCUMENTS 10,636,305 B1 * 4/2020 Schmidt ................. G08G 1/143
11,932,237 B2 * 3/2024 Ernesti ............... B62D 15/0285
(Continued)

FOREIGN PATENT DOCUMENTS

DE 10 2013 015 348 A1 4/2014
DE 10 2013 201 799 A1 8/2014
(Continued)

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).
(Continued)

*Primary Examiner* — Hunter B Lonsberry
*Assistant Examiner* — Robert L Pinkerton
(74) *Attorney, Agent, or Firm* — Crowell & Moring LLP

(57) ABSTRACT

A routing system for automatically routing a motor vehicle is designed to record a drive trajectory for a routing maneuver in a parking area in a recording mode on the basis of a route being traversed by a driver by means of the motor vehicle in a manual driving operation, said parking area having multiple levels. The routing system is additionally designed to store first level information for describing a level of the parking area in which the traversed route is arranged in combination with the recorded travel trajectory. Furthermore, the routing system is designed to use the recorded travel trajectory and the first level information for an automated routing maneuver in an automated mode.

17 Claims, 6 Drawing Sheets

(56) References Cited

U.S. PATENT DOCUMENTS

| 2016/0362103 | A1* | 12/2016 | Büschenfeld | G08G 1/005 |
| 2018/0136666 | A1* | 5/2018 | Max | B62D 15/0285 |
| 2019/0075203 | A1* | 3/2019 | Suzuki | G08G 1/144 |
| 2022/0282512 | A1* | 9/2022 | Shikano | G08G 1/146 |
| 2022/0326039 | A1* | 10/2022 | Takanohashi | G08G 1/143 |
| 2025/0128698 | A1* | 4/2025 | Sharma Banjade | G08G 1/148 |

FOREIGN PATENT DOCUMENTS

| DE | 10 2014 011 697 A1 | 2/2016 |
| EP | 3 095 676 A1 | 11/2016 |

OTHER PUBLICATIONS

International Search Report (PCT/ISA/210) issued in PCT Application No. PCT/EP2022/076740 dated Jan. 24, 2023 with English translation (5 pages).

German-language Written Opinion (PCT/ISA/237) issued in PCT Application No. PCT/EP2022/076740 dated Jan. 24, 2023 with English translation (12 pages).

German-language Search Report issued in German Application No. 10 2021 126 742.0 dated Jun. 24, 2022 with partial English translation (12 pages).

* cited by examiner

ROUTING SYSTEM AND METHOD FOR AUTOMATICALLY ROUTING A MOTOR VEHICLE IN A MULTILEVEL PARKING AREA

BACKGROUND AND SUMMARY

The invention relates to a maneuvering system and to a corresponding method for the automated maneuvering of a motor vehicle in a multi-floor or multi-story parking area, such as for example a multi-story car park or an underground car park.

A vehicle may have a maneuvering system that enables the user of the vehicle to maneuver the vehicle in an automated manner on the basis of a driving trajectory that is stored in advance, for example to guide it longitudinally and/or transversely along the stored driving trajectory to a parking space in a parking lot in an automated manner. In this connection, the maneuvering system may be designed to automatically recognize, for example on the basis of GNSS sensor data and/or on the basis of odometry data, that the vehicle is located in the immediate vicinity of the stored driving trajectory. Based on this, an offer may be made to the user to maneuver the vehicle in an automated manner via a user interface.

In multi-story (also referred to as multi-floor) parking areas, erroneous offers to perform automated maneuvers may occur. This may impair the comfort of the maneuvering system and/or result in erroneous maneuvers.

The present document deals with the technical problem of increasing the comfort and/or the reliability of a maneuvering system in a multi-story maneuvering area, in particular in a multi-story car park or in an underground car park.

The problem is solved by the present disclosure. Advantageous embodiments are also described, inter alia, in the present disclosure. It is pointed out that additional features of a patent claim dependent on an independent patent claim, without the features of the independent patent claim or only in combination with a subset of the features of the independent patent claim, may form a separate invention independent of the combination of all of the features of the independent patent claim and that may be made into the subject matter of an independent claim, a divisional application or a subsequent application. This applies analogously to the technical teaching described in the description, which teaching may form an invention independent of the features of the independent patent claims.

According to one aspect, a description is given of a maneuvering system for the automated maneuvering of a motor vehicle. The driver is able to record a driven maneuver in such a maneuvering system. The maneuvering system is able to use its own location for example to recognize when the motor vehicle is located at a possible activation point for a stored maneuver, and the driver may be made an offer to drive the stored maneuver automatically. Provision may be made for the system, during the maneuver driven in an automated manner (also referred to as replication), to stick as close as possible to the maneuver predefined by the driver (in particular to a recorded driving trajectory), provided that the vehicle surroundings permit this.

The automation mode may in this case be started possibly only at a possible activation point starting from which the automated maneuvering may then begin based on the recorded driving trajectory. By way of example, provision may be made for a possible activation point to be present when the motor vehicle is located precisely on a recorded trajectory. In one alternative embodiment, a possible activation point is present when the current distance of the motor vehicle from a recorded trajectory is less than or equal to a threshold value (for example 0.5 meters); in this case, an additional trajectory may then be determined for the recorded trajectory in order to guide the motor vehicle in an automated manner from the activation point to the recorded trajectory and to follow the recorded trajectory from there.

The maneuvering system is configured (in a recording mode), based on the route driven by the driver with the motor vehicle in a manual driving mode (with manual longitudinal guidance and/or with manual transverse guidance), to record a driving trajectory for a maneuver in a (multi-story) parking area, wherein the parking area has multiple floors. The recorded driving trajectory is in this case designed such that the driving trajectory is able to be used for an automated maneuver (that is to say for automated maneuvering) in an automation mode of the maneuvering system.

Within the scope of this document, the term "automated maneuvering" or "automated driving" is understood to mean automated longitudinal and/or transverse guidance. The term "automated maneuvering" or "automated driving" comprises automated maneuvering or driving with any degree of automation. Exemplary degrees of automation are assisted, partly automated, highly automated, fully automated and autonomous driving (each having an increasing degree of automation). The abovementioned five degrees of automation correspond to SAE Levels 1 to 5 of the SAE J3016 standard (SAE-Society of Automotive Engineering). In the case of assisted driving (SAE Level 1), the system performs longitudinal or transverse guidance in certain driving situations. In the case of partly automated driving (SAE Level 2), the system takes over longitudinal and transverse guidance in certain driving situations, wherein the driver has to monitor the system at all times, like in the case of assisted driving. In the case of highly automated driving (SAE Level 3), the system takes over longitudinal and transverse guidance in certain driving situations without the driver having to monitor the system at all times; however, the driver must be able, within a certain time, to take over vehicle guidance upon request from the system. In the case of fully automated driving (SAE Level 4), the system takes over vehicle guidance in certain driving situations, even when the driver does not respond to a request to intervene, such that the driver is no longer present as a fallback level. In the case of autonomous driving (SAE Level 5), all aspects of the dynamic driving task may be performed by the system under any road and environmental conditions that are also able to be managed by a human driver.

The maneuvering system is furthermore configured to store, in connection with the recorded driving trajectory, (first) floor information in relation to the and/or for the purpose of indicating the floor of the parking area on which the driven route is arranged. The multi-story or multi-floor parking area may for example, starting from the entrance floor of the parking area, have N higher floors and/or M lower floors (where N, M≥0, and at least N or M≥1). The (first) floor information may indicate the number of the floor (starting from the entrance floor) on which the (at least the possible activation point of the) recorded driving trajectory is arranged.

The (first) floor information may be determined manually by querying the driver of the vehicle. In this case, the query may be output for example via a user interface (of the vehicle or of a mobile user device of the driver). The (first) floor information may then be input by the driver via the user interface. As an alternative or in addition, the (first) floor information may be determined automatically by the vehicle (for example on the basis of GNSS (global navigation satellite system) sensor data, on the basis of odometry data, for instance camera data, and/or on the basis of incline data in relation to the incline of the vehicle on the journey to the recorded driving trajectory).

The maneuvering system may thus be configured, in the recording mode, in addition to the route, in particular in addition to waypoints on the driven route, also to determine and store the floor on which the route is arranged. The maneuvering system may furthermore be configured, in the automation mode, to use the recorded driving trajectory and the stored (first) floor information for an automated maneuver. This makes it possible, in an efficient and reliable manner, to offer and perform automated maneuvers on the correct floor in the automation mode. The comfort and the reliability of the maneuvering system may be increased as a result.

The maneuvering system may be configured, when the vehicle is driven in the parking area again, to determine (second) floor information in relation to the and/or for the purpose of indicating the floor on which the vehicle is located (for example based on the measures described further below). It may then be ascertained, on the basis of the determined (second) floor information and on the basis of the stored (first) floor information, whether or not the vehicle is located in an approach area, in particular in an activation area, of the recorded driving trajectory. For this purpose, the determined (second) floor information may be compared with the (first) floor information stored in connection with the recorded driving trajectory in order to ascertain whether or not the vehicle (on the correct floor) is located in the approach area of the recorded driving trajectory.

When the vehicle is driven in the parking area again, it is thus possible to check whether the vehicle is located on the floor of the recorded driving trajectory. It may also be checked whether the vehicle is located in the approach area, in particular in the activation area, of the recorded driving trajectory. When both conditions are met (in particular only when both conditions are met), automated maneuvering of the motor vehicle may be made possible on the basis of the recorded driving trajectory. The comfort and the reliability of the maneuvering system may thus be further increased.

The maneuvering system may be configured to output an offer to the driver of the vehicle to perform an automated maneuver based on the recorded driving trajectory via a user interface (of the vehicle and/or of a mobile user device) when it is ascertained (in particular only when it is ascertained) that the vehicle is located in the approach area of the recorded driving trajectory. The driver may then accept the offer in order to bring about the performance of the automated maneuver. This makes it possible to enable particularly reliable and comfortable operation of the maneuvering system.

The maneuvering system may be configured, in the recording mode, to store at least one possible activation point starting from which an automated maneuver is able to be performed based on the recorded driving trajectory in the automation mode of the maneuvering system. It is then possible to determine and store (first) floor information in relation to the floor of the parking area on which the possible activation point is arranged. The comfort and the reliability of the maneuvering system may thus be further increased.

The maneuvering system may be configured to record a driving trajectory for a maneuver in the parking area based on a driven route that is arranged on a single floor of the parking area. It is then possible to determine and/or store (first) floor information for the purpose of indicating this single floor of the parking area. Limiting maneuvers to a single floor makes it possible to increase the reliability of the maneuvering system.

The maneuvering system may be configured to ascertain, on the basis of GNSS data and/or on the basis of image data from at least one surroundings camera of the vehicle, that the vehicle has passed the respective same location at two successive times on a journey, and/or passed a location in each case, wherein the passed locations resemble one another to such an extent that the locations passed at the two successive times appear to be the same. By way of example, it may be recognized that two locations were passed at two successive times, these two locations having such a high degree of similarity, in accordance with a specific similarity measure, that the two locations appear to be the same.

This may be the case in particular in a multi-story parking area in which the parking lots on the different floors are often similar and usually are not able to be distinguished on the basis of GNSS data (for example on the basis of GPS coordinates).

The maneuvering system may furthermore be configured to ascertain, on the basis of sensor data from an incline sensor of the vehicle (that is to say on the basis of incline data), that the vehicle has driven across a ramp between two different floors between the two successive times.

Based on such a situation, it is then possible to efficiently and reliably determine the (first and/or second) floor information in relation to the and/or for the purpose of indicating the floor of the parking area on which the vehicle is located. As an alternative or in addition, it is possible to ascertain, based on such a situation, that the vehicle has driven to a higher or to a lower floor of the parking area between the two successive times. Based thereon, it is then in turn possible to infer the (first and/or second) floor information.

The combined evaluation of GNSS data, image data and/or incline data makes it possible to determine the (first and/or second) floor information in a particularly precise manner.

According to a further aspect, a description is given of a (further) maneuvering system for the automated maneuvering of a motor vehicle. The aspects described in connection with a maneuvering system may also be applied individually or in combination to this maneuvering system.

The maneuvering system is configured (in the automation mode) to determine (second) floor information in relation to the and/or for the purpose of indicating the floor of a multi-story parking area on which the motor vehicle is located (for example based on the measures described in this document).

The maneuvering system is furthermore configured, based on the determined (second) floor information and based on stored (first) floor information in relation to the and/or for the purpose of indicating the floor of the driving trajectory recorded in a previous journey, to ascertain whether or not the vehicle is located in the approach area, in particular in the activation area, of the recorded driving trajectory.

The maneuvering system may furthermore be configured to output an offer to the driver of the vehicle to perform an automated maneuver based on the recorded driving trajectory via a user interface when (in particular only when) it is ascertained that the vehicle is located in the approach area, in particular in the activation area, of the recorded driving trajectory.

According to a further aspect, a description is given of a (road-based) motor vehicle (in particular a passenger car or a truck or a bus) that comprises at least one of the maneuvering systems described in this document.

According to a further aspect, a description is given of a method for enabling an automated maneuver of a motor vehicle. The method comprises recording, based on a route driven by the driver with the motor vehicle in a manual driving mode, a driving trajectory for a maneuver in a parking area, wherein the parking area has multiple floors. The method furthermore comprises storing, in connection with the recorded driving trajectory, (first) floor information in relation to and/or for the purpose of indicating a floor of the parking area in which the driven route (in particular at least one waypoint of the route) is arranged.

According to a further aspect, a description is given of a method for the automated maneuvering of a motor vehicle. The method comprises determining (second) floor information in relation to the and/or for the purpose of indicating the floor of a multi-story parking area on which the motor vehicle is located. The method furthermore comprises ascertaining, based on the determined (second) floor information and based on stored (first) floor information in relation to the and/or for the purpose of indicating the floor of a driving trajectory recorded in a previous journey, whether or not the vehicle is located in the approach area, in particular in the activation area, of the recorded driving trajectory.

The method furthermore comprises outputting an offer to the driver of the vehicle to perform an automated maneuver based on the recorded driving trajectory via a user interface when (in particular only when) it is ascertained that the vehicle is located in the approach area, in particular in the activation area, of the recorded driving trajectory.

According to a further aspect, a description is given of a software (SW) program. The SW program may be configured to be executed on a processor (for example on a controller of a vehicle) and thereby to carry out at least one of the methods described in this document.

According to a further aspect, a description is given of a storage medium. The storage medium may comprise an SW program that is configured to be executed on a processor and thereby to carry out at least one of the methods described in this document.

It should be noted that the methods, devices and systems described in this document may be used both on their own and in combination with other methods, devices and systems described in this document. Furthermore, any aspects of the methods, devices and systems described in this document may be combined with one another in a wide variety of ways. The features of the claims may in particular be combined with one another in a wide variety of ways. Features introduced in parentheses are also to be understood as optional features.

The invention is described in more detail below with reference to exemplary embodiments.

DETAILED DESCRIPTION OF THE DRAWINGS

Figure 1:
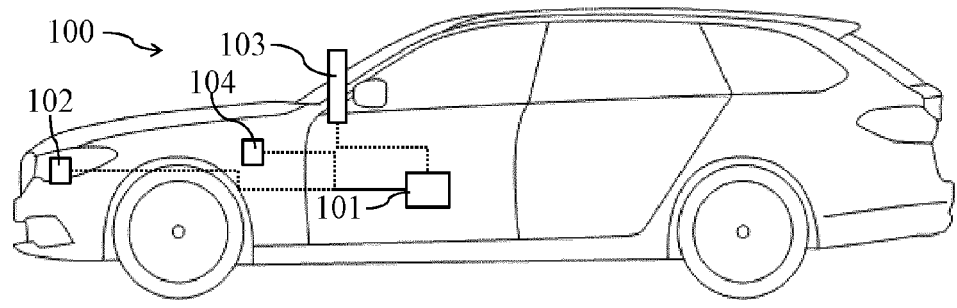
FIG. 1 shows one example of a vehicle with a maneuvering system.

As set forth in the introduction, the present document deals with increasing the comfort and/or the reliability of a vehicle maneuvering system when driving in a multi-story parking area. In this connection, FIG. 1 shows one example of a vehicle 100 that comprises one or more surroundings sensors 102 for acquiring surroundings data, that is to say sensor data, in relation to the surroundings of the vehicle 100. The one or more surroundings sensors 102 may comprise: a front surroundings sensor system directed forward from the driver's point of view, a side surroundings sensor system directed to the left, a side surroundings sensor system directed to the right and/or a rear surroundings sensor system directed backward. The front and rear surroundings sensor systems may each comprise multiple ultrasound sensors and preferably one or more cameras. A radar sensor system and/or a lidar sensor system may possibly also be present. The side surroundings sensor systems may each comprise one or more ultrasound sensors and preferably one or more cameras.

The surroundings data from the one or more surroundings sensors 102 may be received by an electronic control unit 101 for performing automated maneuvering. The electronic control unit 101 for performing automated maneuvering may actuate an electronic head unit 103 and may receive information therefrom, wherein the head unit 103 may in turn be used to actuate a central touch-sensitive screen in the vehicle cockpit and to receive input signals entered via the touch-sensitive screen. The control unit 101 for performing automated maneuvering may be designed to actuate a transmission control unit, a steering control unit and/or an engine control unit (that is to say one or more longitudinal and/or transverse guidance actuators 104) of the motor vehicle 100, in particular in order to guide the motor vehicle 100 longitudinally and/or transversely in an at least partially automated manner.

The maneuvering system is configured, in a recording mode, to record a driving trajectory based on a route driven by the driver with the motor vehicle 100 in manual driving mode. In this case, for example, the following are recorded at regular route distances (for example every 50 cm) on the manually driven route for the respective vehicle position (for example with respect to the center of the rear axle of the vehicle 100 as reference position) as a sampling point of the trajectory:

- GNSS-based vehicle location coordinates (GNSS-global navigation satellite system); and/or
- odometry-based vehicle location coordinates and/or the vehicle orientation; and/or
- camera data (for example image data from one or more cameras of the vehicle 100).

The maneuvering system is furthermore configured, in an automation mode, to maneuver the vehicle 100 in an automated manner starting from a possible activation point for automated maneuvering based on the recorded driving trajectory.

The maneuvering system may furthermore comprise a driving-up mode for assisting the manual driving of the motor vehicle 100 up to the driving trajectory that is recorded (in manual driving mode), wherein, as part of the driving-up mode, assistance information concerning the current position of the recorded driving trajectory in relation to the motor vehicle 100 may be output to the driver such that, in manual driving mode, the motor vehicle 100 is able to be driven up to the recorded driving trajectory and thereby to a possible activation point for the automated maneuvering using the assistance information.

Figure 2A:
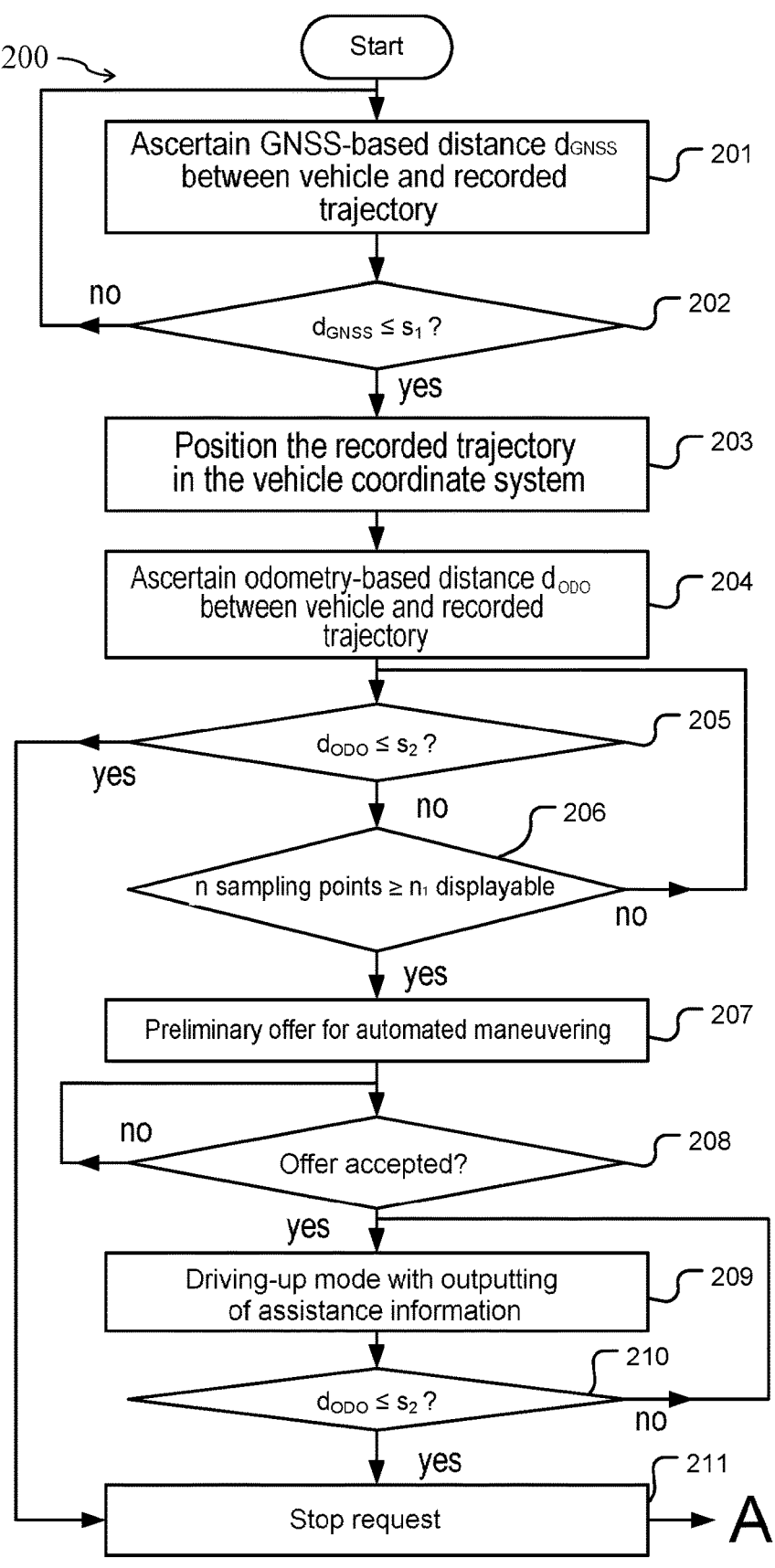
FIGS. 2a and 2b show a flowchart of one example of a method for performing an automated maneuver.
Figure 2B:
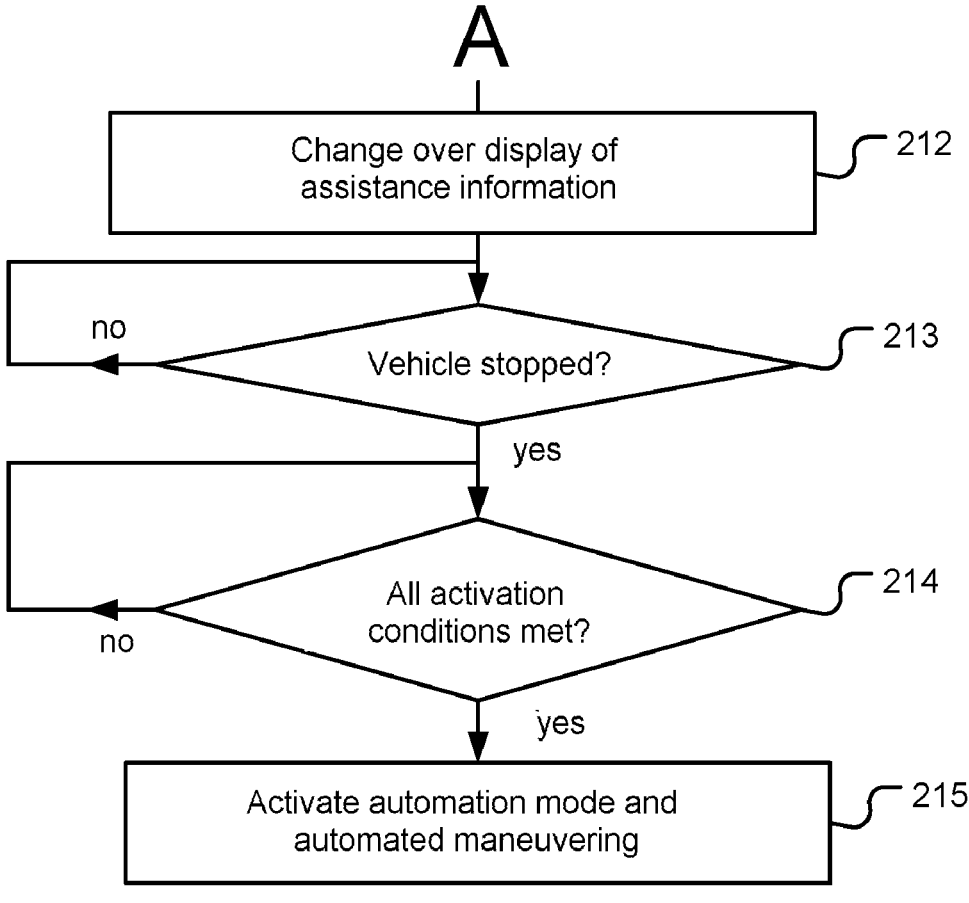

FIGS. 2a and 2b show one example of a flowchart of a method 200 concerning the activation and function of the maneuvering system, in particular in connection with the driving-up mode.

In step 201, the distance dGNSS between the ego motor vehicle 100 and a driving trajectory recorded in the vehicle 100 is repeatedly ascertained (if multiple driving trajectories have been recorded for different vehicle maneuvers, this is performed for each driving trajectory). The ascertaining of the distance is preferably started only when a certain limit speed (for example 30 km/h) is fallen below. The distance dGNSS may in this case be determined based on the stored GNSS-based location coordinates of all points of the trajectory and/or based on the current GNSS-based location coordinates of the motor vehicle 100, wherein the distance dGNSS is for example the minimum distance from the points of the trajectory.

If it is established in step 202 that the distance dGNSS from a recorded maneuver is less than or equal to a predefined threshold value s1 (for example s1=10 m), the system may start the more accurate localization. This approach area within a radius of for example s1=10 m around the route of a recorded driving maneuver 5 is illustrated by reference sign 1 in FIG. 3.

As part of the more accurate localization, in step 203, the recorded driving trajectory is positioned in the vehicle coordinate system. In step 204, an odometry-based distance dODO, which is characterized by higher accuracy (in comparison with the GNSS-based distance dGNSS), between the ego vehicle 100 and the recorded trajectory 5 is then ascertained in the vehicle coordinate system, wherein the distance dODO is preferably the minimum distance from the points of the recorded trajectory 5. When determining the distance dODO, camera information from one or more cameras 102 of the vehicle 100 is preferably additionally used.

In the query 205, it is checked whether the odometry-based distance dODO between the ego vehicle 100 and the recorded trajectory 5 is less than or equal to the threshold value s2 (for example where s2=1.0 m). If this is the case, the motor vehicle 100 is already located in a possible activation position, and thus in an activation area, marked by reference sign 3 in FIG. 3, around the recorded trajectory 5, wherein an automated maneuver may be started in the activation region 3.

If the odometry-based distance dODO is greater than the threshold value s2, it is checked whether the motor vehicle 100 is already located in a close area around the recorded trajectory 5. For this purpose, it is checked whether at least n1 (for example n1=3) or more sampling points of the recorded trajectory are already able to be displayed on a surroundings display displayed on the screen (see query 206). The close area, which is marked by reference sign 2 in FIG. 3, typically begins for example, depending on the situation, at a distance of the order of magnitude of around 2-3 m around the stored trajectory 5. If the motor vehicle 100 is located in the close area 2, the user may receive a preliminary offer for automated maneuvering (see step 207) via the screen, and the stored maneuver may be displayed on the screen such that the driver is able to drive the vehicle 100 manually up to the activation area 3.

Figure 4A:
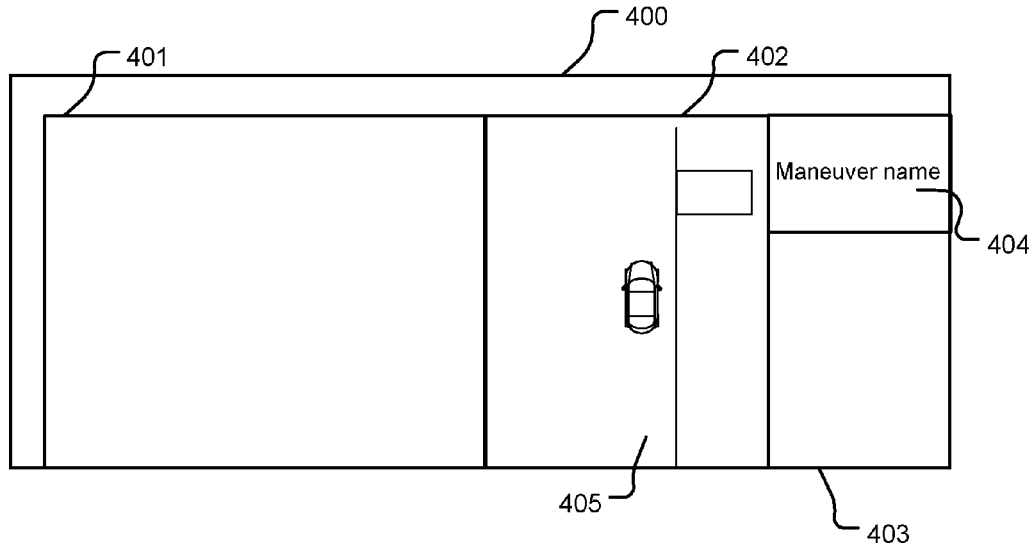
FIGS. 4a and 4b show one example of a display of the maneuvering system, displayed in the motor vehicle.

This is illustrated by way of example in FIG. 4a. The display 400 in FIG. 4a contains an ego surroundings display 401 (not illustrated in any more detail in FIG. 4a) having a camera-based display of the surroundings in the direction of travel from the ego perspective and a plan-view surroundings display 402 composed of multiple camera images in plan view. The plan-view surroundings display 402 depicts the immediate surroundings, for example limited by the range of the ultrasound sensors. Instead of a camera-based display, a non-camera-based display would also be conceivable, in which for example the outlines of the objects or symbols for the objects are displayed. Furthermore, possible maneuvers may be displayed in a maneuver display 403. In FIG. 4a, a selection panel 404 containing the display of the maneuver name of a stored maneuver is displayed as a preliminary offer. The user may accept the preliminary offer by touching the selection panel 404 or by operating a central operating element.

Figure 4B:
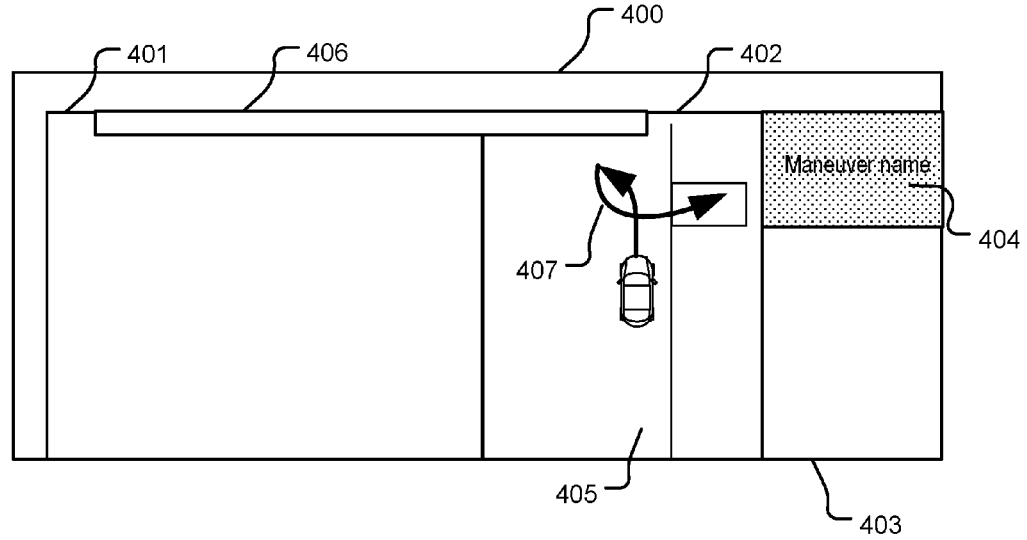

If it is established, in the query 208 in FIG. 2a, that the driver has accepted the preliminary offer, in step 209, it is possible to activate the driving-up mode with the outputting of assistance information concerning the current position of the recorded driving trajectory 5 in relation to the motor vehicle 100 to the driver such that the motor vehicle 100 is able to be driven up to the recorded driving trajectory in manual driving mode and thereby to a possible activation point for the automated maneuvering using the assistance information. In FIG. 4b, the recorded driving trajectory (or at least part of the driving trajectory) in relation to the position of the motor vehicle 100 is output in a positionally correct manner as assistance information 407 on the surroundings display 402. The driving trajectory is preferably also displayed in the ego surroundings display 401 (not illustrated in FIG. 4b). The driver furthermore receives the request, through a text overlay 406, to drive up closer to the recorded driving trajectory in order to start the automated maneuvering (for example "To start the maneuver, please drive up closer to the recorded path"). The recorded position of the trajectory is adapted continuously to the change in position of the motor vehicle 100.

If it is established in the query 210 that, as a result of driving up to the trajectory, the odometry-based distance dODO between the ego vehicle 100 and the recorded trajectory 5 is less than or equal to the threshold value s2, the motor vehicle 100 is located in the activation area 3 and, in step 211, the driver receives a stop request in the form of a corresponding text overlay 406 (for example "To start the recorded maneuver, please stop the vehicle."). Furthermore, in step 212, the display of the assistance information 407 is changed over. For this purpose, for example, the color of the displayed trajectory is changed and the distance along the recorded trajectory to the end point of the trajectory is also displayed. Furthermore, an additional trajectory, computed in addition by a maneuvering system, is possibly displayed (provided that this would not be concealed in any case by the display of the ego vehicle 100), which drives the vehicle in an automated manner from the activation point up to the stored trajectory.

In the query 213 in FIG. 2b, it is checked whether the vehicle has been braked to a stop.

In the query 214, it is queried whether all activation conditions for automated maneuvering have been met.

In the exemplary embodiment, the activation conditions comprise for example one or more of the following conditions:

the motor vehicle 100 is (essentially) at a stop, the brake pedal of the motor vehicle 100 has been released by the driver, the steering wheel of the motor vehicle 100 has been released by the driver, the driver's seatbelt is applied, driver authorization for automated maneuvering is present for the steering and braking system of the vehicle 100, and/or the vehicle doors are closed.

When the activation conditions are met, the automation mode may be activated, possibly without further operating input from the driver, and the vehicle 100 may be maneuvered along the recorded trajectory (see step 215). In this case, the display 400 may continue to display the trajectory, wherein the trajectory display is adapted continuously to the movement of the motor vehicle 100 during the automated maneuvering.

Figure 5A:
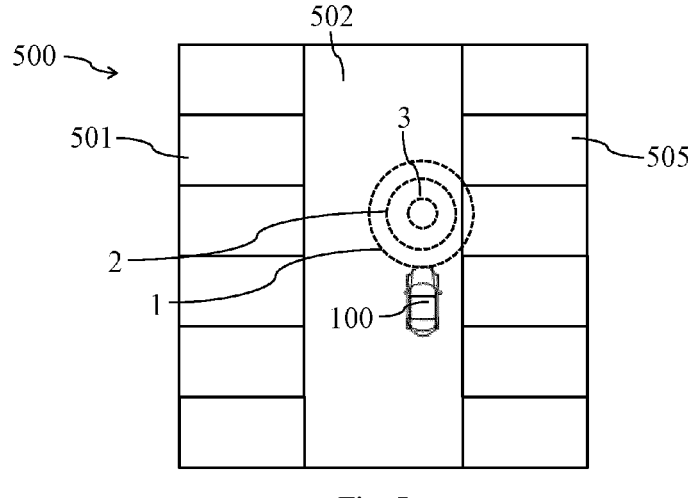
FIG. 5a shows one example of a parking lot having multiple parking spaces.

A parking area, in particular a multi-story car park or an underground car park, may have multiple stories or floors, wherein the parking area is often constructed similarly across the individual floors. A parking area across multiple floors may in particular have a parking lot on each thereof. FIG. 5a shows one example of a parking lot 500 having multiple parking spaces 501, 505, and FIG. 5b shows one example of a parking area 510 having multiple floors 511, with a respective parking lot 500 being arranged on each floor 511.

Figure 5B:
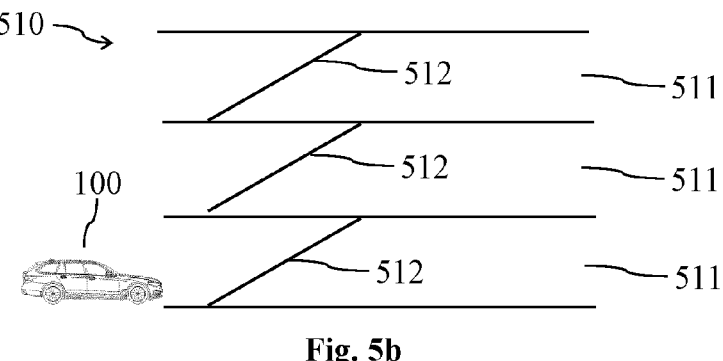
FIG. 5b shows different floors of a multi-story parking area.

The vehicle 100 may, as illustrated in FIG. 5b, enter the parking lot 500 on a first floor 511 at the first floor 511 of the multi-story parking area 510. The vehicle 100 may in this case move past the individual parking spaces 501, 505 on a route 502. The vehicle 100 may then possibly drive across a ramp 512 onto another (second) floor 511 of the parking area 510, which typically contains a further parking lot 500 with parking spaces 501, 505.

The parking lots 500 on the different floors 511 may have a similar or identical structure. As a result, the vehicle 100 may not be able to reliably identify, on the basis of the GNSS sensor data and/or on the basis of the camera sensor data, the floor 511 on which the vehicle 100 is located.

The maneuvering system of the vehicle 100 may contain a stored trajectory 5 for a specific parking space 505 in the parking lot 500 on a specific floor 511 (for example on the second floor). Since, due to the similarity between the parking lots 500 on the different floors 511, it might not be possible to precisely recognize whether the vehicle 100 is located in the parking lot 511 on the specific (for example the second) floor 511, the maneuvering system, when driving in the parking lot 500 on the first floor 511, may possibly already incorrectly recognize that the vehicle 100 is located in the vicinity of the activation point for the stored trajectory 5. By way of example, it may be incorrectly ascertained that the vehicle 100 has entered the approach area 1, in particular the activation area 3, of the stored trajectory 5. In response thereto, the driver of the vehicle 100 may be made an offer to perform an automated maneuver, which, if it were to be accepted, would lead to the vehicle 100 being guided in an automated manner to the parking space 505 in the parking lot 500 on the incorrect floor 511.

The maneuvering system of the vehicle 100, in particular the control unit 101 of the maneuvering system, may be designed, in the recording mode for recording a trajectory 5, to store floor information in relation to the floor 511 of the recorded trajectory 5, in particular in relation to the floor 511 of the possible activation point of the recorded trajectory 5.

The floor information may possibly be queried via the user interface (on the head unit 103) of the vehicle 100 and be input by the driver. As an alternative or in addition, the floor information may be determined by the vehicle 100. For this purpose, for example, information in relation to the incline of the vehicle 100 when driving within the parking area 510 may be evaluated. On the basis of the incline of the vehicle 100, it may be recognized for example that the vehicle 100 has driven across a ramp 512 onto another floor 511. It is then possible to determine the number of ramps 512 across which the vehicle 100 has driven until reaching the parking space 505 for which the trajectory 5 is recorded.

A stored trajectory 5 for a maneuver may thus, in addition to location coordinates of one or more sampling points (in particular of a possible activation point) of the stored trajectory 5, contain floor information in relation to the floor 511 of the possible activation point within a multi-story parking area 510.

The maneuvering system, in particular the control unit 101 of the maneuvering system, may furthermore be configured, when the vehicle 100 is driven in the multi-story parking area 510 again, to determine floor information in relation to the floor 511 on which the vehicle 100 is located in each case. The floor information may in this case again be determined on the basis of the incline of the vehicle 100 (wherein the incline may be acquired using an incline sensor of the vehicle 100). It may then be checked, on the basis of the determined floor information, whether the vehicle 100 is located in the surroundings, in particular in the approach area 1, in the close area 2 or in the activation area 3, of a stored trajectory 5. For this purpose, the floor information determined for the repeated journey may be compared with the floor information stored for the trajectory 5. It may then be checked whether the vehicle 100 is located on the correct floor 511 for the stored trajectory. If this is the case, then an offer for an automated maneuver may be output (as described for example in step 207 for the driving-up mode, or a direct offer without a driving-up mode). If this is not the case, then the offer may be suppressed.

This document thus addresses the technical problem that, in multi-story car parks or underground car parks 510 with surroundings that are repeated on different floors 511, GNSS and/or image data are often not sufficient to position the vehicle 100 on the correct story 511. GNSS data usually do not supply any, or any reliable, information about the height and/or the floor 511 (including due to the relatively poor GNSS reception in a multi-story car park or in an underground car park 510). The image data acquired by the one or more cameras of the vehicle 100 are usually also not able to be used to distinguish between the floors 511, since the different floors 511 look similar. This may lead to a maneuvering system potentially incorrectly outputting an offer for a maneuver to a stored trajectory 5 on each floor 511 of a multi-story car park or underground car park 510.

The maneuvering system may therefore be designed to recognize, in an odometry-based (in particular two-dimensional) manner, that a certain location is approached repeatedly at successive times (for example in each case on a different floor 511). This information may be combined with incline information in relation to the incline of the vehicle 100 between the repeated approaches of the specific location (that is to say between the successive times) in order to recognize that the vehicle 100 has driven to a higher floor 511 or to a lower floor 511. It is thus possible to determine three-dimensional odometry information. This floor information in relation to the current floor 511 of the vehicle 100 (relative to the entrance floor 511 of the multi-story car park or underground car park 510) may be stored in connection with a recorded trajectory 5, and ultimately used for the localization of a previously stored maneuver.

In one example of a multi-story car park 510, the entrance to the multi-story car park 510 is on floor 0. From the entrance to the multi-story car park, the ramps 512 in the multi-story car park 510 are arranged for example on the right and left side. The parking spaces 501, 505 of the parking lot 500 of the respective floor 511 are located between them. In order to drive from one floor 511 to the next floor 511, the vehicle 100 has to drive past all of the parking spaces 501, 505 of the respective floor 511. In this case, the parking lots 500 on all floors 511 look the same: for example with regard to the arrangement of lights, columns, walls, sporadically parked vehicles, etc.

The target parking space 505 for the vehicle 100 (for which a stored trajectory 5 is present) may be arranged for example on the 5th floor 511 of the multi-story car park 510. To record the trajectory 5, the user first drove to the 5th floor 511. The recording of the maneuver was then initiated on the 5th floor 511, and the trajectory 5 driven in manual driving mode was then recorded. Floor information in relation to the 5th floor 511 may also have been determined and stored.

When driving in the multi-story car park 510 again, the driver drives to the 5th floor 511 (in manual driving mode). In the process, the X, Y GNSS location coordinates are repeated on each floor 511, and in each case the features of the stored trajectory 5 are identified on the basis of the image data from the one or more vehicle cameras 102 (on the basis of the similar parking lots 500). Without considering the floor information, the driver of the vehicle 100 would receive an offer for an automated maneuver on each floor 511. If the offer were to be accepted, the vehicle 100 would then be parked in an automated manner in a parking space 505 on an incorrect floor 511.

By considering the floor information, the maneuvering system is given the ability to compare the target floor stored for the maneuver with the actual floor of the vehicle 100. An offer for the automated maneuver may then possibly be output only when, in addition to the GNSS location coordinates and the image-based location coordinates, the actual floor also matches the target floor. This makes it possible to ensure, in an efficient and reliable manner, that the vehicle 100 offers and carries out the stored maneuver on the correct floor 511.

Figure 6A:
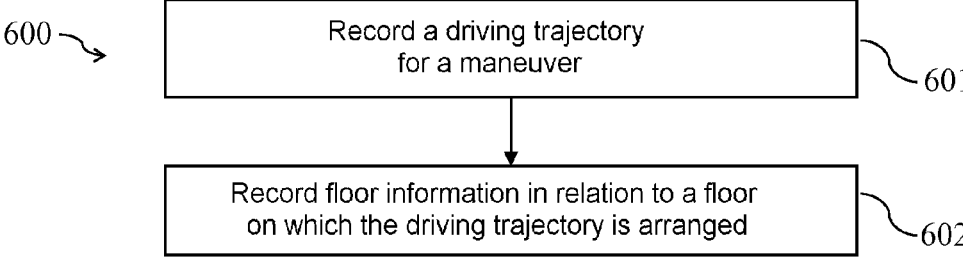
FIG. 6a shows a flowchart of one example of a method for operating a maneuvering system in a recording mode.

FIG. 6a shows a flowchart of a (possibly computer-implemented) method 600 for enabling an automated maneuver of a motor vehicle 100. The method 600 may be carried out by the control unit 101 of a maneuvering system of the motor vehicle 100 (during the recording mode), for example as part of a first journey, in order to enable an automated maneuver in a subsequent second journey.

The method 600 comprises recording 601, based on a route driven by the driver with the motor vehicle 100 in a manual driving mode, a driving trajectory 5 for a maneuver in a (multi-story) parking area 510, wherein the parking area 510 has multiple floors 511. The recorded driving trajectory 5 may in this case be able to be used for an automated maneuver, in particular such that the vehicle 100 follows the route driven in manual driving mode in an essentially automated manner. The route may in this case be driven in the same or in the opposite direction of travel.

The method 600 furthermore comprises storing 602, in connection with the recorded driving trajectory 5, floor information in relation to the and/or for the purpose of indicating the floor 511 of the parking area 510 on which the driven route is arranged. The floor information may be determined automatically on the basis of GNSS sensor data, odometry data (in particular image data) and/or incline data from an incline sensor of the vehicle 100. As an alternative or in addition, the floor information may be determined through a query to the driver of the vehicle 100.

Figure 6B:
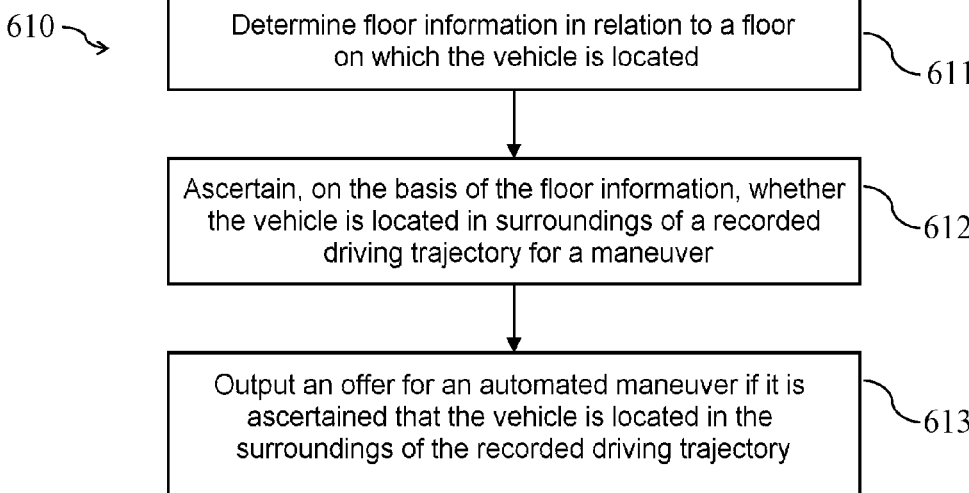
FIG. 6b shows a flowchart of one example of a method for operating a parking system in an automation mode.

FIG. 6b shows a flowchart of a (possibly computer-implemented) method 610 for the automated maneuvering of a motor vehicle 100. The method 610 may be carried out by the control unit 101 of a maneuvering system of the motor vehicle 100 (during the automation mode).

The method 610 comprises determining 611 floor information in relation to the and/or for the purpose of indicating the floor 511 of a multi-story parking area 500 in which the motor vehicle 100 is located. The floor information may be determined automatically on the basis of GNSS sensor data, odometry data (in particular image data) and/or incline data from an incline sensor of the vehicle 100.

The method 610 furthermore comprises ascertaining 612, based on the determined floor information and based on stored floor information in relation to the floor 511 of a driving trajectory 5 recorded in a previous journey, whether or not the vehicle 100 is located in the approach area 1, in particular in the close area 2 and/or in the activation area 3, of the recorded driving trajectory 5. For this purpose, it may be checked, on the basis of the floor information, whether or not the vehicle 100 is located on the floor 511 of the recorded driving trajectory 5. It may furthermore be determined whether the vehicle 100 is at most a certain maximum distance away from a possible activation point of the recorded driving trajectory 5.

Figure 3:
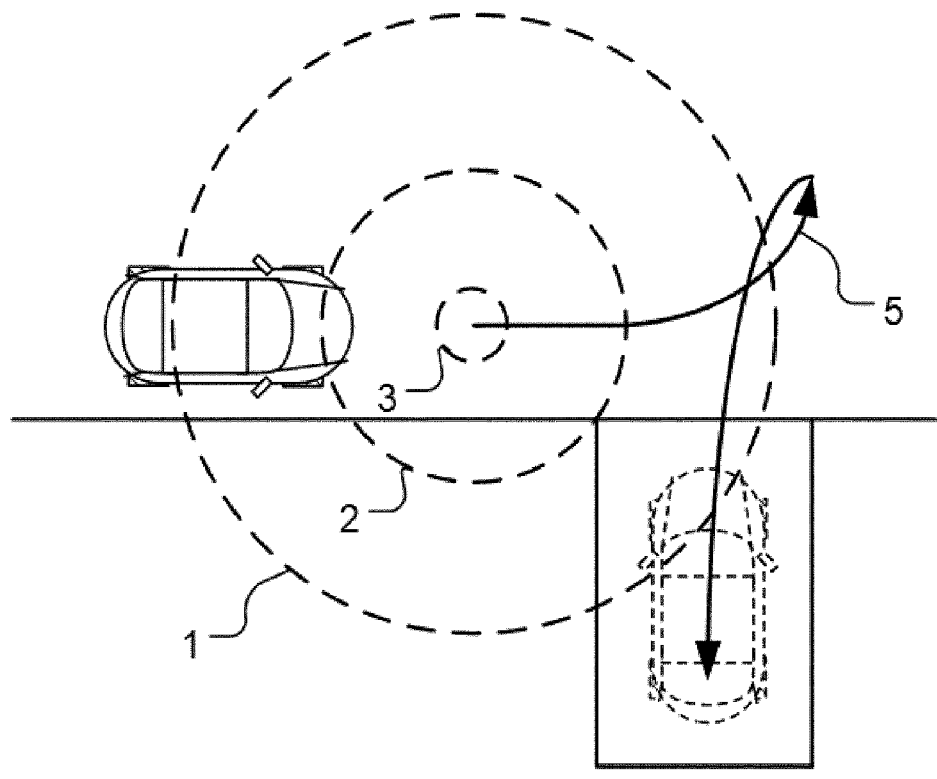
FIG. 3 shows one example of an approach area, one example of a close area and one example of an activation area.

It should be noted that, in FIG. 3, the approach area 1, the close area 2 and/or the activation area 3 are illustrated by way of example as circles around a certain possible activation point on the driving trajectory 5. Typically, multiple points, in particular all points, on the driving trajectory 5 are possible activation points. A circular approach area 1, close area 2 and/or activation area 3 may be arranged around each possible activation point. Overlaying the circular areas 1, 2, 3 for possible activation points then results in tubular areas 1, 2, 3 along the driving trajectory 5. The approach area 1, the close area 2 and/or the activation area 3 may thus each be in the form of tubes along the driving trajectory 5 (each having a different tube width transverse to the driving trajectory 5).

The method 610 furthermore comprises outputting 613 an offer to the driver of the vehicle 100 to perform an automated maneuver based on the recorded driving trajectory 5 via a user interface (of the vehicle 100 or of a mobile user device of the driver) when it is ascertained that the vehicle 100 is located in the approach area 1 (in particular in the close area 2 and/or in the activation area 3) of the recorded driving trajectory 5. Otherwise, the outputting of an offer may be dispensed with (in particular when the vehicle 100 is not located on the correct floor 511).

The measures described in this document make it possible to increase the comfort and the reliability of a maneuvering system.

The present invention is not restricted to the exemplary embodiments that are shown. It should in particular be noted that the description and the figures are intended to illustrate the principle of the proposed methods, devices and systems only by way of example.

What is claimed is:

1. A maneuvering system for automated maneuvering of a motor vehicle, wherein the maneuvering system is configured to:

record a driving trajectory for a maneuver in a parking area based on a route driven by a driver with the motor vehicle in a manual driving mode, wherein the parking area has multiple floors;

determine first floor information indicating a floor of the parking area on which the route corresponding to the recorded driving trajectory is located;

store the first floor information in association with the recorded driving trajectory; and operate the motor vehicle to autonomously execute the maneuver based on the recorded driving trajectory and the first floor information.

2. The maneuvering system according to claim 1, wherein the maneuvering system is configured to:

record a driving trajectory for a maneuver in the parking area based on a driven route that is arranged on a single floor of the parking area; and store first floor information for the purpose of indicating this single floor of the parking area.

3. The maneuvering system according to claim 1, wherein the maneuvering system is configured to:

store at least one possible activation point starting from which an automated maneuver is able to be performed based on the recorded driving trajectory in the automation mode of the maneuvering system; and store first floor information for the purpose of indicating a floor of the parking area on which the possible activation point is arranged.

4. The maneuvering system according to claim 1, wherein the maneuvering system is configured to:

determine floor information on a basis of sensor data from an incline sensor of the vehicle when driving in the parking area.

5. The maneuvering system according to claim 1, wherein the maneuvering system is configured to:

ascertain, on a basis of global navigation satellite system (GNSS) data and/or on a basis of image data from at least one surroundings camera of the vehicle, that the vehicle has passed a respective location at two successive times on a journey, which locations resemble one another to such an extent that the locations passed at the two successive times appear to be the same;

ascertain, on a basis of sensor data from an incline sensor of the vehicle, that the vehicle has driven across a ramp between two different floors between the two successive times; and ascertain, based thereon, that the vehicle has driven to a higher or to a lower floor of the parking area between the two successive times; and/or, based thereon, determine floor information for a purpose of indicating the floor of the parking area on which the vehicle is located.

6. The maneuvering system according to claim 1, wherein the maneuvering system is configured to:

when the vehicle is driven in the parking area again, determine second floor information for the purpose of indicating the floor on which the vehicle is located; and on a basis of the determined second floor information and on a basis of the stored first floor information, ascertain whether the vehicle is located in an approach area of the recorded driving trajectory.

7. The maneuvering system according to claim 6, wherein the maneuvering system is configured to:

compare the determined second floor information with the first floor information stored in connection with the recorded driving trajectory to ascertain whether the vehicle is located in the approach area of the recorded driving trajectory.

8. The maneuvering system according to claim 6, wherein the maneuvering system is configured to:

output an offer to the driver of the vehicle to perform an automated maneuver based on the recorded driving trajectory via a user interface in response to ascertaining that the vehicle is located in the approach area of the recorded driving trajectory.

9. A method for enabling an automated maneuver of a motor vehicle, comprising:

recording, based on a route driven by a driver with the motor vehicle in a manual driving mode, a driving trajectory for a maneuver in a parking area, wherein the parking area has multiple floors;

determining first floor information indicating a floor of the parking area on which the route corresponding to the recorded driving trajectory is located, and storing the first floor information in association with the recorded driving trajectory; and operating the motor vehicle to autonomously execute the maneuver based on the recorded driving trajectory and the first floor information.

10. The method according to claim 9, comprising:

recording a driving trajectory for a maneuver in the parking area based on a driven route that is arranged on a single floor of the parking area; and storing first floor information for the purpose of indicating this single floor of the parking area.

11. The method according to claim 9, comprising:

storing at least one possible activation point starting from which an automated maneuver is able to be performed based on the recorded driving trajectory in the automation mode of the maneuvering system; and storing first floor information for the purpose of indicating a floor of the parking area on which the possible activation point is arranged.

12. The method according to claim 9, comprising:

determining floor information on a basis of sensor data from an incline sensor of the vehicle when driving in the parking area.

13. The method according to claim 9, comprising:

ascertaining, on a basis of global navigation satellite system (GNSS) data and/or on a basis of image data from at least one surroundings camera of the vehicle, that the vehicle has passed a respective location at two successive times on a journey, which locations resemble one another to such an extent that the locations passed at the two successive times appear to be the same;

ascertaining, on a basis of sensor data from an incline sensor of the vehicle, that the vehicle has driven across a ramp between two different floors between the two successive times; and ascertaining, based thereon, that the vehicle has driven to a higher or to a lower floor of the parking area between the two successive times; and/or, based thereon, determining floor information for a purpose of indicating the floor of the parking area on which the vehicle is located.

14. The method according to claim 9, comprising:

when the vehicle is driven in the parking area again, determining second floor information for the purpose of indicating the floor on which the vehicle is located; and on a basis of the determined second floor information and on a basis of the stored first floor information, ascertaining whether the vehicle is located in an approach area of the recorded driving trajectory.

15. The method according to claim 14, comprising:

comparing the determined second floor information with the first floor information stored in connection with the recorded driving trajectory to ascertain whether the vehicle is located in the approach area of the recorded driving trajectory.

16. The method according to claim 14, comprising:

outputting an offer to the driver of the vehicle to perform an automated maneuver based on the recorded driving trajectory via a user interface in response to ascertaining that the vehicle is located in the approach area of the recorded driving trajectory.

17. A method for automated maneuvering of a motor vehicle, comprising:

determining second floor information indicating a floor of a multilevel parking area on which the motor vehicle is located;

ascertaining, based on the determined second floor information and based on stored first floor information indicating a floor of a driving trajectory recorded in a previous journey, whether the vehicle is located in an approach area of the recorded driving trajectory; and in response to ascertaining that the vehicle is located in the approach area, outputting an offer to the driver of the vehicle to perform an automated maneuver based on the recorded driving trajectory via a user interface;

operating the vehicle to execute the automated maneuver in response to the driver accepting the offer.

* * * * *